Dec. 29, 1931.  M. W. INGRAHAM  1,838,486
COMBINATION NECKTIE AND COLLAR STUD
Filed April 27, 1931
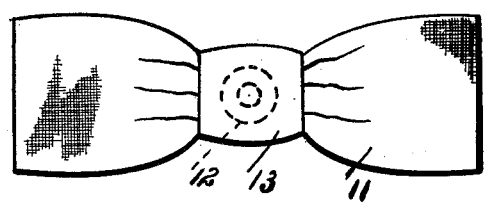
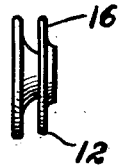
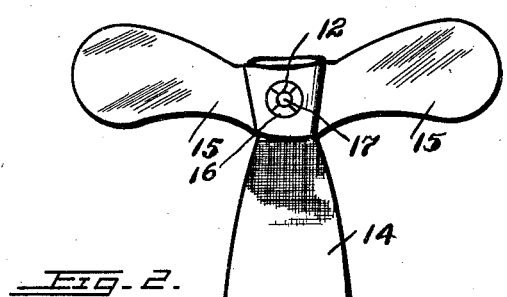
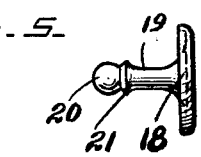
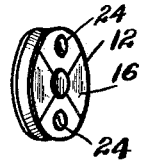
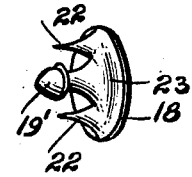
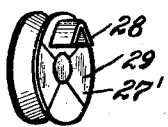
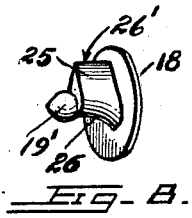
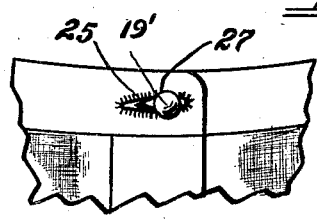
Inventor
Matthew Wilson Ingraham
By Frederick E. Bromley
Attorney.

Patented Dec. 29, 1931

1,838,486

UNITED STATES PATENT OFFICE

MATTHEW WILSON INGRAHAM, OF NORTH SYDNEY, NOVA SCOTIA, CANADA

COMBINATION NECKTIE AND COLLAR STUD

Application filed April 27, 1931. Serial No. 533,181.

The invention relates to a combined necktie and collar stud as described in the present specification and shown in the accompanying drawings which form part of the same.

The invention has for its object to provide a necktie and collar stud with interfitting fastening elements in the form of a dome fastener whereby the tie can be readily snapped onto the stud in order to hold it securely and firmly in place. A very distinctive feature of the invention is that the stud may be used alone in its ordinary capacity.

A salient feature of this device resides in the provisions for preventing the necktie from becoming askew.

In carrying out the invention, the collar stud has its head shaped to form the male part of the dome fastener, and the necktie, which is of the ready-made type, has a female element of a dome fastener embodied in it so as to fit onto the head of the stud. Means are also provided on the stud and the female dome fastener element to prevent the tie from swivelling upon the stud or in any way becoming awry.

Referring to the drawings:

Figure 1 depicts a ready-made bow tie.

Figure 2 shows a ready-made four-in-hand tie.

Figure 3 is an edge view of the female element of a dome fastener.

Figure 4 is a face view thereof.

Figure 5 is a side elevation of the collar stud.

Figure 6 is a perspective view of the stud showing a slightly modified form for preventing it from turning.

Figure 7 is a perspective view of the female element of the dome fastener complementary to that shown in Figure 6.

Figure 8 is a further modification depicting means for preventing the stud from turning, and Figure 9 is a perspective view of the female element of the dome fastener complementary to that shown in Figure 8.

Figure 10 is a fragmentary view of the collar band portion of the shirt illustrating the collar stud shown in Figure 8 fitted in the front button holes of the neckband.

Referring to the drawings, the reference numeral 11 denotes a bow tie the rear face of which is provided with the female element 12 of the dome fastener, which element for the sake of convenience will be hereinafter referred to as a "socket". The socket is attached to or embodied in the knot portion 13 of the bow tie in convenient manner, the mode of affixing it being such as to prevent it from turning.

In Figure 2, the four-in-hand tie 14 is likewise equipped with a socket 12 and has wings 15 as customarily provided on ready-made ties, which wings may, however, be dispensed with if so desired. The disc face 16 of the socket has the usual opening 17 for receiving the male element of the dome fastener.

18 generally designates the stud which has the usual shank 19 that is inserted through the buttonholes of both the shirt neckband and the collar. The head 20 is depicted in Figure 5 in spherical form similar to the conventional male element of a dome fastener in order that it may be snapped into locking engagement with the socket 12. The rear portion of the head is provided with an annular shoulder 21 preferably rearwardly bevelled as shown in order to provide a secure seat for the socket so as to prevent it from rocking on the head. The shoulder is preferably of a diameter equal to that of the head. It may be here remarked that if so desired the head may be somewhat tapered or pointed as shown at 19' in Figures 6 and 8 with a view to facilitating its entering the opening 17 of the socket. It will be readily apparent that by the foregoing description of the socket and stud the interfitting connection readily provides for attaching the tie to the stud firmly and securely.

The modification depicted in Figures 6 and 7 for preventing the tie from becoming awry comprises one or more spurs 22 rising from the base 23 of the stud so that by pressure of these spurs against the neckband of the shirt the stud is held rigid in the buttonholes. Recesses are provided as at 24 in the face 16 of the socket 12 to accommodate the tips of the spurs 22 and thereby preclude the socket from turning. It will be readily seen that this construction prevents the tie from swivelling or otherwise becoming askew.

The further modification shown in Figures 8 to 10 inclusive depicts another means for accomplishing the same end. In this case the stud has a projection or a wing as at 25 integral with a shank 26 and projecting laterally thereof so as to enter the buttonholes and project therethrough as seen at 27 in Figure 10. This projection is preferably wedge shaped as shown so as to taper to its lateral edge 26' and is of no greater width than that of the shank so as to readily enter the buttonholes. The projection prevents the stud from turning. This key projection could if so desired be extended on both sides of the shank. The complementary socket 27' has a V-shaped member 28 projecting from its face 29 so as to fit over the projection or wing 25 and thereby keep the tie from turning.

What I claim is:—

In combination, a tie, a female element of a dome fastener fixed to the rear face of the knot portion thereof, a stud having a head for interfitting engagement with said female element, a rigid wing laterally projecting from the stud shank for entering and protruding from the front buttonholes of a shirt and collar, and a member rigidly projecting from the aforesaid female element so as to fit over the wing to prevent the tie from turning.

Signed at Sydney, Nova Scotia, Canada, this 14th day of April, 1931.

MATTHEW WILSON INGRAHAM.